US012192250B2

(12) United States Patent
Park et al.

(10) Patent No.: US 12,192,250 B2
(45) Date of Patent: Jan. 7, 2025

(54) ELECTRONIC DEVICE FOR PROVIDING CALL FUNCTION AND OPERATING METHOD THEREOF

(71) Applicant: Samsung Electronics Co., Ltd., Suwon-si (KR)

(72) Inventors: Jonghyun Park, Suwon-si (KR); Eunkyoung Lee, Suwon-si (KR); Kirak Bae, Suwon-si (KR); Seungnam Jin, Suwon-si (KR); Yongchul Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 285 days.

(21) Appl. No.: 17/736,630

(22) Filed: May 4, 2022

(65) Prior Publication Data

US 2022/0407896 A1 Dec. 22, 2022

Related U.S. Application Data

(63) Continuation of application No. PCT/KR2022/004881, filed on Apr. 5, 2022.

(30) Foreign Application Priority Data

Jun. 14, 2021 (KR) .................. 10-2021-0076463
Aug. 13, 2021 (KR) .................. 10-2021-0107192

(51) Int. Cl.
*H04L 65/1016* (2022.01)
*H04L 65/1073* (2022.01)
(Continued)

(52) U.S. Cl.
CPC ...... *H04L 65/1016* (2013.01); *H04L 65/1073* (2013.01); *H04W 36/00226* (2023.05); *H04W 76/10* (2018.02); *H04W 84/12* (2013.01)

(58) Field of Classification Search
CPC ............ H04L 65/1016; H04L 65/1073; H04L 65/1095; H04W 36/0022; H04W 36/0026;
(Continued)

(56) References Cited

U.S. PATENT DOCUMENTS 10,791,450 B1\* 9/2020 Bakker .................. H04W 4/90
10,893,444 B2 1/2021 Zhu et al.
(Continued)

FOREIGN PATENT DOCUMENTS

CA 2947936 A1 \* 11/2014 ........... G06Q 50/265
CN 106470465 B 5/2021
(Continued)

OTHER PUBLICATIONS

Ericsson etc., 'Use of EPS/RAT fallback for VoWiFi session', S2-2001577, 3GPP TSG SA2 Meeting # 136AH, Incheon, KR, Section 4.13.6.3, Jan. 17, 2020.
(Continued)

*Primary Examiner* — Chi H Pham
*Assistant Examiner* — Vladislav Y Agureyev
(74) *Attorney, Agent, or Firm* — Jefferson IP Law, LLP

(57) ABSTRACT

The disclosure relates to an apparatus and method for providing a call function in an electronic device. The electronic device includes first communication circuitry supporting new radio (NR) communication and/or long term evolution (LTE) communication, second communication circuitry supporting wireless local area network (LAN) communication, and at least one processor operatively connected to the first communication circuitry and the second communication circuitry. The processor may be configured to resister the electronic device with a network using the NR communication through the first communication circuitry, connect communication with an evolved packet data gateway (ePDG) based on a protocol data unit (PDU) session
(Continued)

being identified as being connected over a network using wireless LAN communication in a state in which the electronic device has registered with the network using the NR communication, obtain information related to a call function of the network using the NR communication based on the communication connection with the ePDG, connect the PDU session over the network using the wireless LAN communication, and control the connection with the network using the NR communication based on the information related to the call function of the network using the NR communication.

10 Claims, 11 Drawing Sheets

(51) Int. Cl.
    *H04W 36/00*     (2009.01)
    *H04W 76/10*     (2018.01)
    *H04W 84/12*     (2009.01)

(58) Field of Classification Search
    CPC ..... H04W 76/10; H04W 84/12; H04W 48/02; H04W 48/16
    See application file for complete search history.

(56) References Cited

U.S. PATENT DOCUMENTS

| | | | |
|---|---|---|---|
| 12,058,581 B2* | 8/2024 | Zhao | H04M 7/006 |
| 2017/0318511 A1 | 11/2017 | Niranjan et al. | |
| 2018/0270781 A1* | 9/2018 | Baek | H04W 60/06 |
| 2019/0274082 A1* | 9/2019 | Vemuri | H04W 36/0083 |
| 2019/0349822 A1* | 11/2019 | Kim | H04W 36/0069 |
| 2020/0187088 A1* | 6/2020 | Chun | H04W 48/02 |
| 2021/0051530 A1* | 2/2021 | Venkataraman | H04L 65/1053 |
| 2021/0068069 A1* | 3/2021 | Li | H04W 60/00 |
| 2021/0105691 A1 | 4/2021 | Zhu et al. | |
| 2021/0112394 A1* | 4/2021 | Bakker | H04W 4/90 |
| 2021/0127314 A1* | 4/2021 | Mukherjee | H04W 36/304 |
| 2021/0136645 A1 | 5/2021 | Zhao et al. | |
| 2021/0153290 A1* | 5/2021 | Ahmad | H04W 76/16 |
| 2021/0227437 A1* | 7/2021 | Venkataraman | H04W 48/02 |
| 2022/0210670 A1* | 6/2022 | Kawasaki | H04W 24/02 |
| 2023/0379368 A1* | 11/2023 | Yang | H04L 65/1016 |
| 2023/0379704 A1* | 11/2023 | Li | H04W 12/08 |

FOREIGN PATENT DOCUMENTS

| | | | | |
|---|---|---|---|---|
| EP | 3 340 691 A1 | 6/2018 | | |
| EP | 3982607 A1 * | 4/2022 | | H04W 12/06 |
| EP | 3697123 B1 * | 2/2024 | | H04W 24/04 |
| KR | 10-2017-0123286 A | 11/2017 | | |
| KR | 10-2022-0002105 A | 1/2022 | | |
| WO | 2021/087413 A1 | 5/2021 | | |

OTHER PUBLICATIONS

Qualconn Incorporated etc., 'Use of EPS/RAT fallback for VoWiFi session', S2-1912644, 3GPP TSG SA2 Meeting #136, Reno, USA, Section 4.13.6.x, Nov. 22, 2019.

International Search Report dated Jun. 30, 2022, issued in International Patent Application No. PCT/KR2022/004881.

* cited by examiner

ELECTRONIC DEVICE FOR PROVIDING CALL FUNCTION AND OPERATING METHOD THEREOF

CROSS-REFERENCE TO RELATED APPLICATION(S)

This application is a continuation application, claiming priority under § 365(c), of an International application No. PCT/KR2022/004881, filed on Apr. 5, 2022, which is based on and claims the benefit of a Korean patent application number 10-021-0076463, filed on Jun. 14, 2021, in the Korean Intellectual Property Office, and of a Korean patent application number 10-2021-0107192, filed on Aug. 13, 2021, in the Korean Intellectual Property Office, the disclosure of each of which is incorporated by reference herein in its entirety.

TECHNICAL FIELD

The disclosure relates to an apparatus and method for providing a call function in an electronic device.

BACKGROUND ART

In order to satisfy wireless data traffic demands that tend to increase after 4-th generation (4G) communication system commercialization, efforts to develop an enhanced 5-th generation (5G) communication system or a pre-5G communication system are being made. For this reason, the 5G communication system or the pre-5G communication system is called a beyond 4G network communication system or a post LTE communication system. In order to achieve a high data transfer rate, an implementation of the 5G communication system in a band of 6 GHz or less (e.g., a 1.8 GHz band or a 3.5 GHz band) or a higher frequency band (e.g., a 28 GHz band or a 39 GHz band) is taken into consideration. In order to reduce a path loss of a radio wave and increase the transfer distance of a radio wave, beam-forming, massive multiple-input multiple-output (MIMO), full dimensional MIMO (FD-MIMO), an array antenna, analog beamforming and large scale antenna technologies are being discussed in the 5G communication system.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may register with a network using a 5-th generation (5G) communication method (e.g., new radio (NR) communication) having a standalone (SA) structure. If the network using the 5G communication method supports a call function (e.g., voice of NR (VoNR)), the electronic device may provide a call function (e.g., VoNR) with an external electronic device over the network using the 5G communication method. If the network using the 5G communication method does not support a call function (e.g., VoNR), the electronic device may register with a network using a 4-th generation (4G) communication method (e.g., long term evolution (LTE) communication) based on evolved packet system (EPS) fallback, and may provide a call function (e.g., voice of LTE (VoLTE)) with an external electronic device.

An electronic device may provide a call function (e.g., voice of Wi-Fi (VoWi-Fi)) with an external electronic device through a wireless local area network (LAN) communication method (e.g., Wi-Fi) operating in conjunction with a core network (e.g., an evolved packet core (EPC)) or a 5G core (5GC)) using the 4G communication method or the 5G communication method through an evolved packet data gateway (ePDG). When identifying that a call connection with the external electronic device through the wireless LAN communication method based on signal quality (e.g., signal intensity) of the wireless LAN communication cannot be maintained, the electronic device may perform handover to a network (e.g., a network using the 5G communication method or the 4G communication method) with which the electronic device now registers. However, if the network using the 5G communication method with which the electronic device now registers does not support a call function (e.g., VoNR), there may occur a problem in that a call connection with an external electronic device is disconnected due to a handover failure to the network using the 5G communication method.

Aspects of the disclosure are to address at least the above-mentioned problems and/or disadvantages and to provide at least the advantages described below. Accordingly, an aspect of the disclosure is to provide an apparatus and method for providing, by an electronic device, a call function with an external electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes first communication circuitry supporting new radio (NR) communication and/or long term evolution (LTE) communication, second communication circuitry supporting wireless LAN communication, and at least one processor operatively connected to the first communication circuitry and the second communication circuitry. The processor may be configured to resister the electronic device with a network using the NR communication through the first communication circuitry, connect communication with an evolved packet data gateway (ePDG) based on a protocol data unit (PDU) session being identified as being connected over a network using wireless LAN communication in a state in which the electronic device has registered with the network using the NR communication, obtain information related to a call function of the network using the NR communication based on the communication connection with the ePDG, connect the PDU session over the network using the wireless LAN communication, and control the connection with the network using the NR communication based on the information related to the call function of the network using the NR communication.

In accordance with another aspect of the disclosure, an operating method of an electronic device is provided. The operating method includes registering with a network using new radio (NR) communication, connecting communication with an evolved packet data gateway (ePDG) based on a protocol data unit (PDU) session being identified as being connected over a network using wireless LAN communication in the state in which the electronic device has registered with the network using the NR communication, obtaining information related to a call function of the network using the NR communication based on the communication connection with the ePDG, connecting the PDU session over the network using the wireless LAN communication, and controlling the connection with the network using the NR communication based on the information related to the call function of the network using the NR communication.

Advantageous Effects

According to various embodiments of the disclosure, an electronic device may reduce a load of a network attributable to handover and continuously provide a call with an external electronic device by blocking the execution of unnecessary handover in a way to selectively maintain communication with a network using a 5G communication method (e.g., NR communication) based on whether the network using the 5G communication method (e.g., NR communication) supports a call function and/or the handover of a PDU session, which is obtained upon connection of the PDU session through communication (e.g., a wireless LAN) using an unlicensed band.

Other aspects, advantages, and salient features of the disclosure will become apparent to those skilled in the art from the following detailed description, which, taken in conjunction with the annexed drawings, discloses various embodiments of the disclosed.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
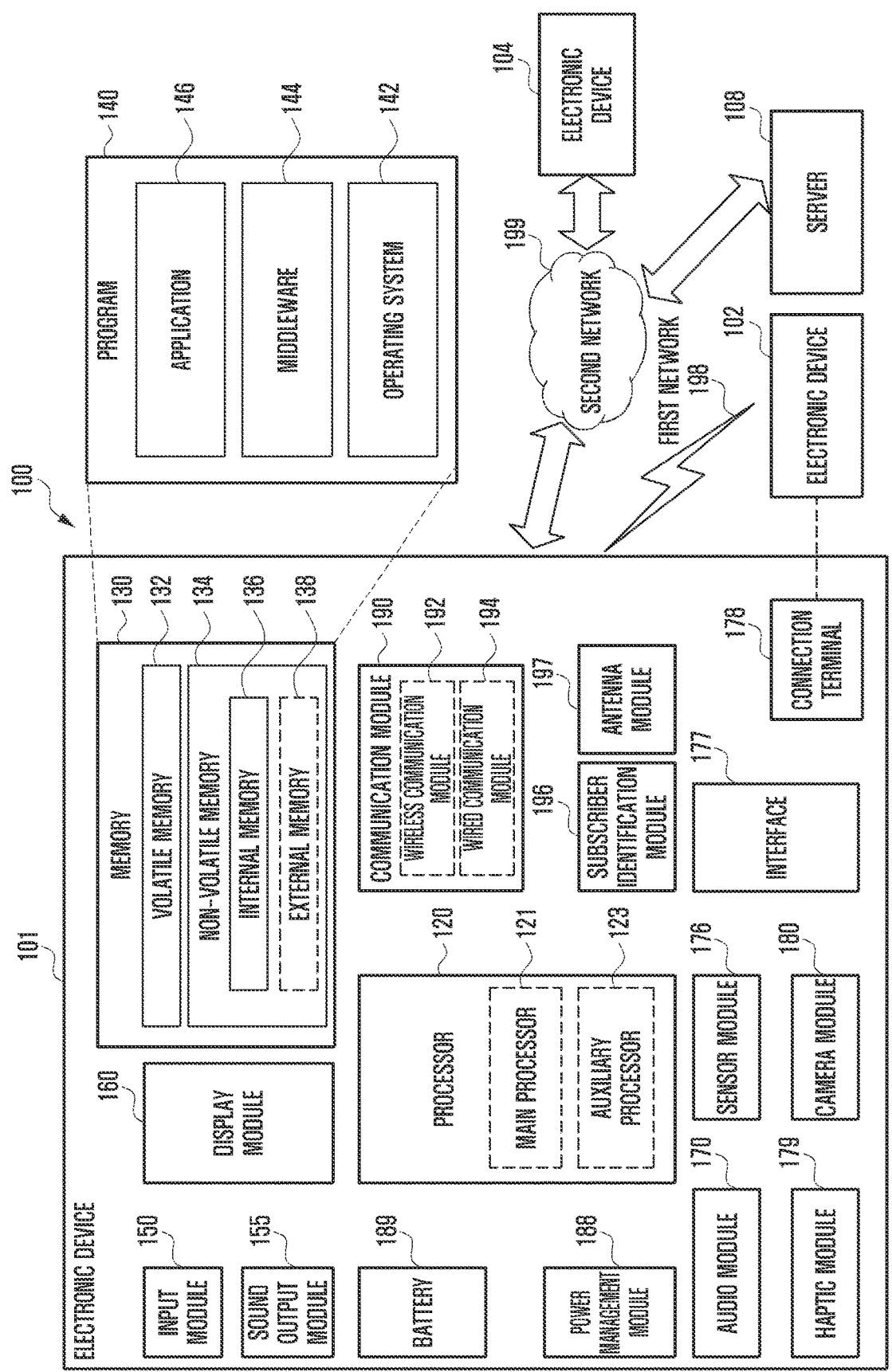
FIG. 1 is a block diagram of an electronic device according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI or IMS)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
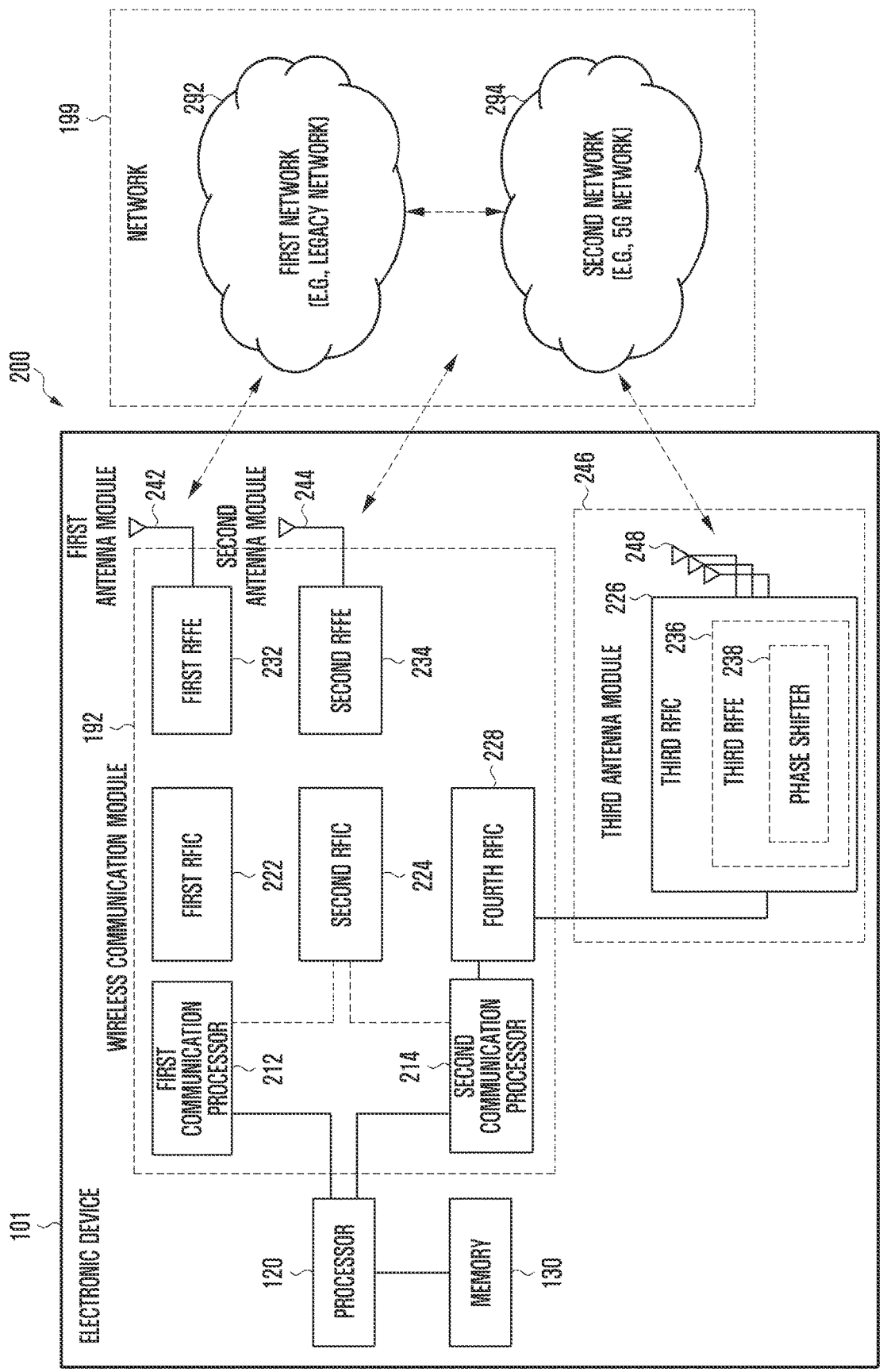
FIG. 2 is a block diagram of an electronic device for supporting legacy network communication and 5G network communication according to an embodiment of the disclosure.

FIG. 2 is a block diagram 200 of the electronic device 101 for supporting legacy network communication and 5G network communication according to an embodiment of the disclosure.

Referring to FIG. 2, according to various embodiments, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294.

According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to another embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel. According to an embodiment, the first network may be a legacy network including $2^{nd}$ generation (2G), $3^{rd}$ generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to an embodiment, the second network 294 may be a 5G network (e.g., new radio (NR)) defined in 3rd generation partnership project (3GPP). In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel. According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this instance, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, so as to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
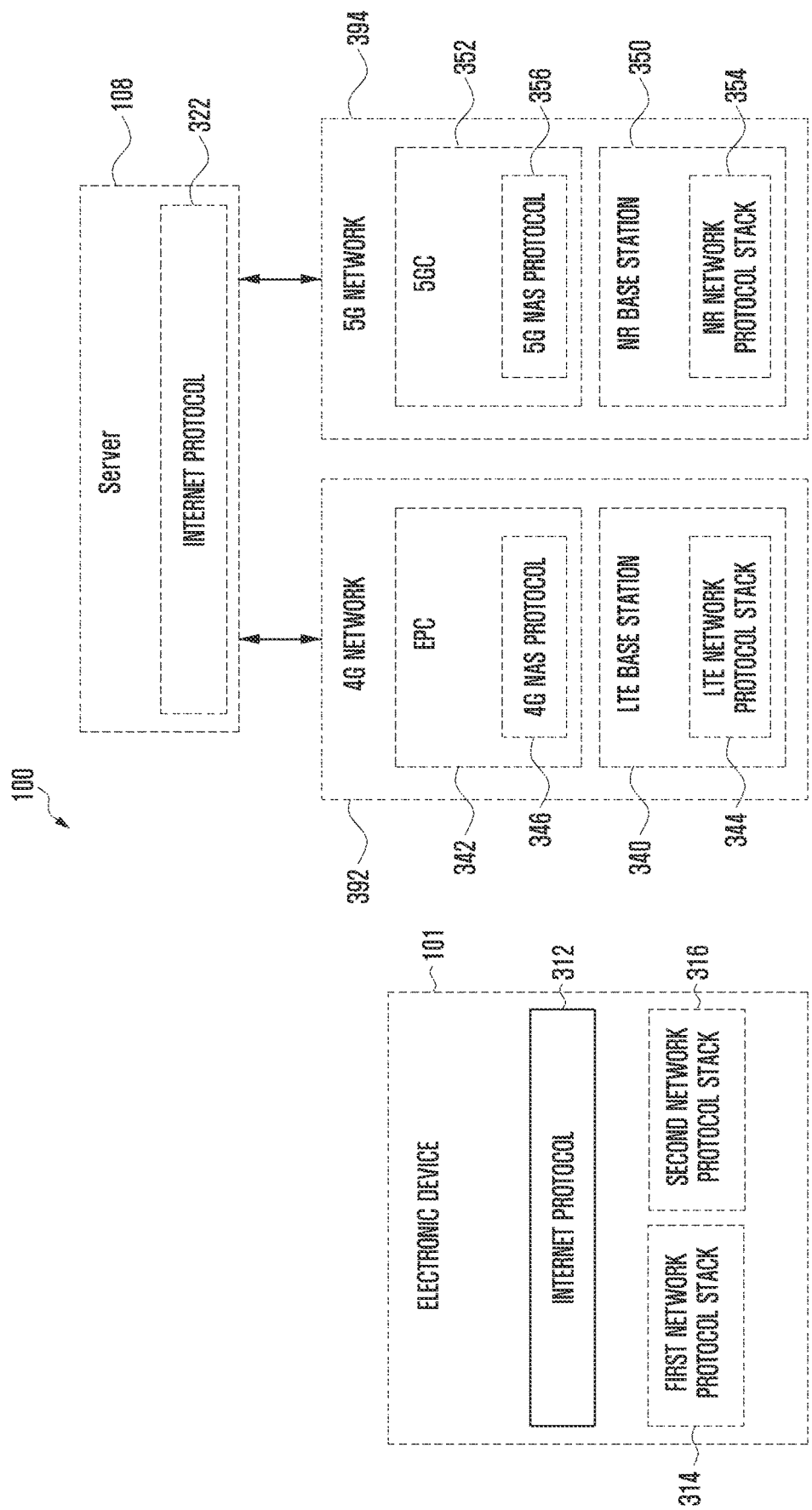
FIG. 3 is a diagram illustrating a protocol stack structure of a network 100 using 4G communication and/or 5G communication according to an embodiment of the disclosure.

FIG. 3 is a diagram illustrating the protocol stack structure of a network 100 of 4G communication and/or 5G communication according to an embodiment of the disclosure.

Referring to FIG. 3, the network 100 according to various embodiments may include the electronic device 101, a 4G network 392, a 5G network 394, and the server 108.

According to various embodiments, the electronic device 101 may include an Internet protocol 312, a first communication protocol stack 314, and a second communication protocol stack 316. For example, the electronic device 101 may communicate with the server 108 via the 4G network 392 and/or 5G network 394.

According to an embodiment, the electronic device 101 may perform Internet communication associated with the server 108 using the Internet protocol 312 (e.g., a transmission control protocol (TCP), a user datagram protocol (UDP), or an internet protocol (IP)). For example, the Internet protocol 312 may be performed in a main processor (e.g., the main processor 121 of FIG. 1) included in the electronic device 101.

According to another embodiment, the electronic device 101 may perform wireless communication with the 4G network 392 using the first communication protocol stack 314. According to another embodiment, the electronic device 101 may perform wireless communication with the 5G network 394 using the second communication protocol stack 316. For example, the first communication protocol stack 314 and the second communication protocol stack 316 may be performed by one or more communication processors (e.g., the wireless communication module 192 of FIG. 1) included in the electronic device 101.

According to various embodiments, the server 108 may include the Internet protocol 322. The server 108 may perform transmission or reception of data related to the Internet protocol 322 with the electronic device 101 via the 4G network 392 and/or 5G network 394. According to an embodiment, the server 108 may include a cloud computing server existing outside the 4G network 392 or the 5G network 394. According to another embodiment, the server 108 may include an edge computing server (or a mobile edge computing (MEC) server) located inside at least one of the 4G network 392 or the 5G network 394.

According to various embodiments, the 4G network 392 may include a long-term evolution (LTE) base station 340 and an evolved packet core (EPC) 342. The LTE base station 340 may include an LTE communication protocol stack 344. The EPC 342 may include a legacy non-access stratum (NAS) protocol 346. The 4G network 392 may perform LTE wireless communication with the electronic device 101 using the LTE communication protocol stack 344 and the legacy NAS protocol 346.

According to various embodiment, the 5G network 394 may include a new radio (NR) base station 350 and a $5^{th}$ generation core (5GC) 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting or receiving a control message and a user plane protocol for transmitting or receiving user data. For example, the control message may include a message related to at least one of security control, bearer setup, authentication, registration, or mobility management. For example, the user data may include, for example, the remaining data, excluding the control message.

According to an embodiment, the control plane protocol and the user plane protocol may include a physical (PHY) layer, a medium access control (MAC) layer, a radio link control (RLC) layer, or a packet data convergence protocol (PDCP) layer. For example, the PHY layer may perform channel coding and modulation of data received from a higher layer (e.g., the MAC layer), and transmit the same to a wireless channel, and may perform demodulation and decoding of data received via a wireless channel and transmit the same to a higher layer. The PHY layer included in the second communication protocol stack 316 and the NR communication protocol stack 354 may further perform an operation related to beamforming. For example, the MAC layer may logically/physically map data to a wireless channel to be transmitted or received, and may perform hybrid automatic repeat request (HARQ) for error correction. For example, the RLC layer may perform concatenation, segmentation, or reassembly of data, may identify the order of data, may perform reordering, and may perform redundancy check. For example, the PDCP layer may perform an operation of ciphering control data and user data, and an operation related to data integrity. The second communication protocol stack 316 and the NR communication protocol stack 354 may further include a service data adaptation protocol (SDAP). For example, the SDAP may manage wireless bearer allocation based on the quality of service (QoS) of user data.

According to various embodiments, the control plane protocol may include a radio resource control (RRC) layer and a non-access stratum (NAS) layer. For example, the RRC layer may process control data related to radio bearer setup, paging, or mobility management. For example, the NAS may process a control message related to authentication, registration, and mobility management.

Figure 4A:
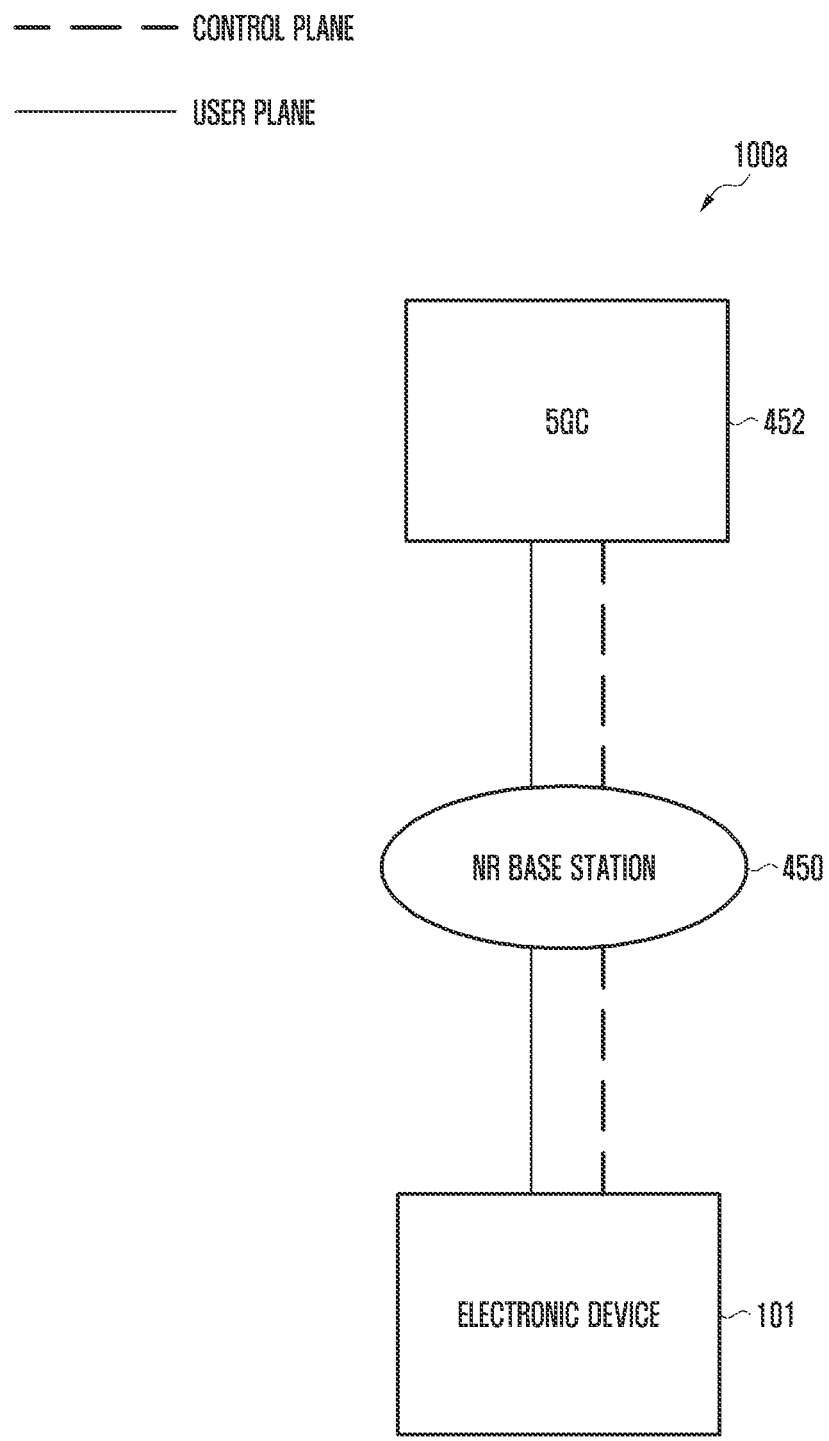
FIG. 4A is an example of a wireless communication system which provides a network using 4G communication and/or 5G communication according to an embodiment of the disclosure.
Figure 4B:
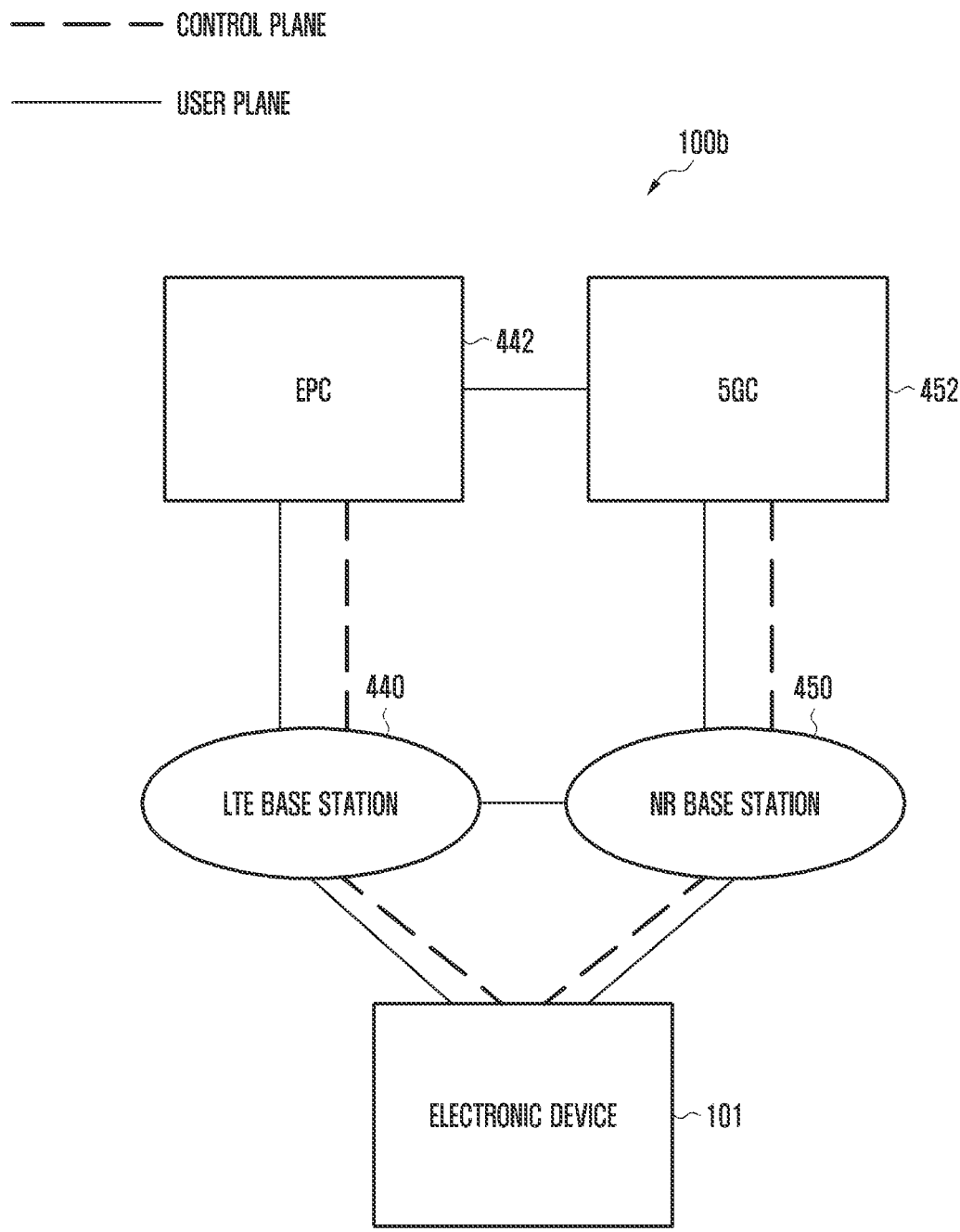
FIG. 4B is an example of a wireless communication system which provides a network using 4G communication and/or 5G communication according to an embodiment of the disclosure.

FIGS. 4A and 4B are examples of a wireless communication system which provides a network using 4-th generation (4G) communication and/or 5-th generation (5G) communication according to various embodiments of the disclosure.

Referring to FIGS. 4A and 4B, a network environment 100A and/or 100B may include at least one of a 4G network or a 5G network. For example, the 4G network may include an LTE base station 440 (e.g., an eNodeB (eNB)) according to the 3GPP standard supporting a wireless connection with the electronic device 101 and an evolved packet core (EPC)) 442 managing 4G communication. For example, the 5G network may include a new radio (NR) base station 450 (e.g., a gNodeB (gNB)) supporting a wireless connection with the electronic device 101 and a 5G core (5GC) 452 managing 5G communication of the electronic device 101.

According to various embodiments, the electronic device 101 may transmit and/or receive data to and/or from control messages and user data through 4G communication and/or 5G communication. For example, the control message may include a message related to at least one of the security control, bearer setup, authentication, registration, or mobility management of the electronic device 101. For example, the user data may mean user data other than control messages transmitted and/or received between the electronic device 101 and a core network (e.g., the EPC 442 and/or the 5GC 452).

According to various embodiments referring to FIG. 4A, the 5G network 100a may independently transmit and/or receive control messages and/or user data to and/or from the electronic device 101.

According to various embodiments referring to FIG. 4B, the 4G network and the 5G network 100b may independently provide the transmission and/or reception of data. For example, the electronic device 101 and the EPC 442 may transmit and/or receive control messages and/or user data through the LTE base station 440. For example, the electronic device 101 and the 5GC 452 may transmit and/or receive control messages and/or user data through the NR base station 450.

According to various embodiments, the electronic device 101 may register with at least one of the EPC 442 or the 5GC 452, and may transmit and/or receive control messages.

According to various embodiments, the EPC 442 or the 5GC 452 may manage the communication of the electronic device 101 through interworking. For example, mobile information of the electronic device 101 may be transmitted and/or received through an interface (e.g., an N26 interface) between the EPC 442 and the 5GC 452.

Figure 5:
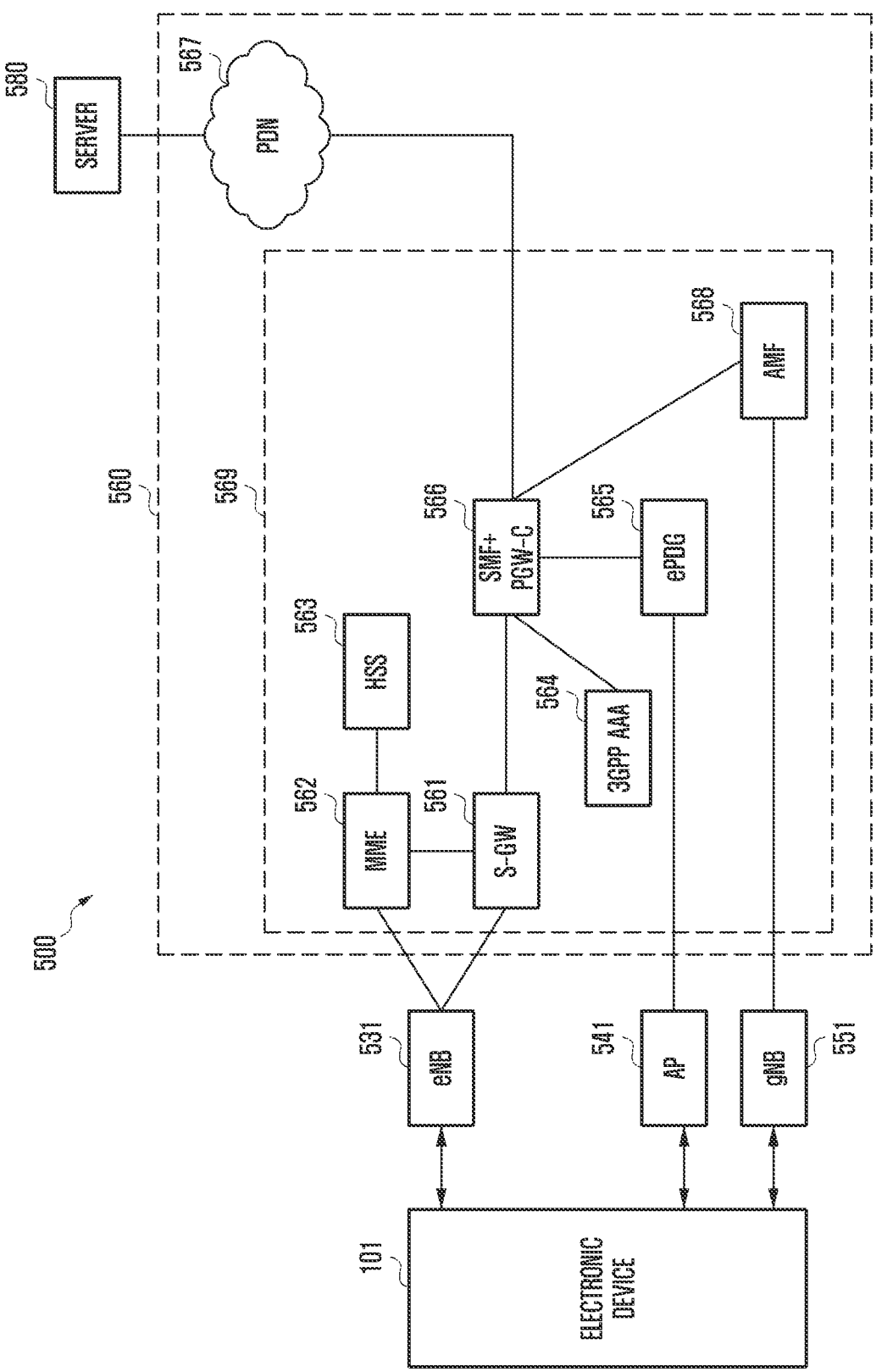
FIG. 5 is an example of a network environment for using a wireless LAN network according to an embodiment of the disclosure.

FIG. 5 is an example of a network environment 500 for using a wireless LAN network according to an embodiment of the disclosure. According to an embodiment, the structure of the network in FIG. 5 may be variously changed. For example, various elements in FIG. 5 may be integrated, subdivided or omitted, and an additional element may be added to the various elements depending on specific needs.

Referring to FIG. 5, a network 560 may include a packet data network (PDN) 567 and a core network 569 (e.g., the EPC 442 and/or the 5GC 452 in FIG. 4B). According to an embodiment, the core network 567 may include a serving gateway (S-GW) 561, a mobility management entity (MME) 562, a home subscriber server (HSS) 563, a 3GPP-authentication, authorization and accounting (AAA) server 564, an evolved packet data gateway (ePDG) 565, a session management function (SMF) and packet data network gateway (PGW-C) 566, and/or an access and mobility management function (AMF) 568.

According to an embodiment, an eNB 531 (e.g., the LTE base station 440 in FIG. 4B) may connect to the electronic device 101 through a wireless channel for a second communication method (e.g., LTE communication). The MME 562 is a node which controls a control plane of the core network 569 (e.g., an EPC), and may perform various functions, such as the connection and/or release of a radio bearer. The S-GW 561 is a node which controls a user plane of a second network (e.g., an LTE radio access network (RAN)) using second wireless communication in the core network 569 (e.g., FIGS. 4A and 4B are examples of a wireless communication system which provides a network using 4-th generation (4G) communication and/or 5-th generation (5G) communication according to various embodiments.

According to various embodiments referring to FIGS. 4A and 4B, a network environment 100A and/or 100B may include at least one of a 4G network or a 5G network. For example, the 4G network may include an LTE base station 440 (e.g., an eNodeB (eNB)) according to the 3GPP standard supporting a wireless connection with the electronic device 101 and an evolved packet core (EPC)) 442 managing 4G communication. For example, the 5G network may include a new radio (NR) base station 450 (e.g., a gNodeB (gNB)) supporting a wireless connection with the electronic device 101 and a 5G core (5GC) 452 managing 5G communication of the electronic device 101.

According to various embodiments, the electronic device 101 may transmit and/or receive data to and/or from control messages and user data through 4G communication and/or 5G communication. For example, the control message may include a message related to at least one of the security control, bearer setup, authentication, registration, or mobility management of the electronic device 101. For example, the user data may mean user data other than control messages transmitted and/or received between the electronic device 101 and a core network (e.g., the EPC 442 and/or the 5GC 452).

According to various embodiments referring to FIG. 4A, the 5G network 100a may independently transmit and/or receive control messages and/or user data to and/or from the electronic device 101.

According to various embodiments referring to FIG. 4B, the 4G network and the 5G network 100b may independently provide the transmission and/or reception of data. For example, the electronic device 101 and the EPC 442 may transmit and/or receive control messages and/or user data through the LTE base station 440. For example, the electronic device 101 and the 5GC 452 may transmit and/or receive control messages and/or user data through the NR base station 450.

According to various embodiments, the electronic device 101 may register with at least one of the EPC 442 or the 5GC 452, and may transmit and/or receive control messages.

According to various embodiments, the EPC 442 or the 5GC 452 may manage the communication of the electronic device 101 through interworking. For example, mobile information of the electronic device 101 may be transmitted and/or received through an interface (e.g., an N26 interface) between the EPC 442 and the 5GC 452.

FIG. 5 is an example of a network environment 500 for using a wireless LAN network according to various embodiments. According to an embodiment, the structure of the network in FIG. 5 may be variously changed. For example, various elements in FIG. 5 may be integrated, subdivided or omitted, and an additional element may be added to the various elements depending on specific needs.

According to various embodiments referring to FIG. 5, a network 560 may include a packet data network (PDN) 567 and a core network 569 (e.g., the EPC 442 and/or the 5GC 452 in FIG. 4B). According to an embodiment, the core network 567 may include a serving gateway (S-GW) 561, a mobility management entity (MME) 562, a home subscriber server (HSS) 563, a 3GPP-authentication, authorization and accounting (AAA) server 564, an evolved packet data gateway (ePDG) 565, a session management function (SMF) and packet data network gateway (PGW-C) 566, and/or an access and mobility management function (AMF) 568.

According to an embodiment, an eNB 531 (e.g., the LTE base station 440 in FIG. 4B) may connect to the electronic device 101 through a wireless channel for a second communication method (e.g., LTE communication). The MME 562 is a node which controls a control plane of the core network 569 (e.g., an EPC), and may perform various functions, such as the connection and/or release of a radio bearer. The S-GW 561 is a node which controls a user plane of a second network (e.g., an LTE radio access network (RAN)) using second wireless communication in the core network 569 (e.g., an EPC), and may operate as a mobility anchor for the electronic device 101 or may generate and/or remove a data bearer under the control of the MME 562. The SMF+PGW-C 566 is a node which connects the core network 569 (e.g., an EPC) and the PDN 567, and may perform the assignment of an IP address and the application of quality of service (QoS) to the electronic device 101. The HSS 563 may store and/or manage subscriber information.

According to an embodiment, an AP 541 may connect to the electronic device 101 through a wireless channel for a third communication method (e.g., wireless LAN communication). The 3GPP-AAA server 564 may provide the SMF+PGW-C 566 with authentication, authorization, policy control, and routing information for access to a network using a wireless LAN communication method. The ePDG 565 may be used to maintain access to the electronic device 101 and provide the electronic device 101 with a continuous service upon handover between a cellular network (e.g., an LTE network and/or an NR network) and a wireless LAN network.

According to an embodiment, a gNB 551 (e.g., the NR base station 450 in FIG. 4B) may connect to the electronic device 101 through a wireless channel for a first communication method (e.g., NR communication). The AMF 568 may process control messages transmitted to and/or received from the electronic device 101 and manage the mobility anchor of the electronic device 101.

According to various embodiments, the electronic device 101 may transmit and/or receive data to and/or from the PDN 567 through the SMF+PGW-C 566, the AMF 568, and the gNB 551.

According to various embodiments, the electronic device 101 may transmit and/or receive data to and/or from the PDN 567 through the SMF+PGW-C 566, the S-GW 561, and the eNB 531.

According to various embodiments, the electronic device 101 may perform handover from the gNB 551 (or the eNB 531) to the AP 541. The electronic device 101 may communicate with the 3GPP-AAA server 564 in order to perform authentication. According to an embodiment, when the authentication of the electronic device 101 is successful, the ePDG 565 may connect communication (e.g., a tunnel) with the SMF+PGW-C 566. The electronic device 101 may be connected to the PDN 567 through the AP 541, the ePDG 565, and the SMF+PGW-C 566. For example, handover may include a series of operations of releasing a connection with the gNB 551 and performing a connection with the AP 541. For example, in the case of a first handover method, after a connection with the gNB 551 is released, a connection with the AP 541 may be performed. For example, in the case of a second handover method, after a connection with the AP 541 is performed, a connection with the gNB 551 may be released.

According to an embodiment, the electronic device 101 may register with a server 580 over the network 560. For example, registration with the server 580 may indicate that a PDN session between the electronic device 101 and the server 580 is connected (or set up) by the SMF+PGW-C 566. For example, the electronic device 101 may initiate a registration operation for the server 580 at booting timing. For example, the electronic device 101 may initiate a registration operation for the server 580 based on a change in the network environment of the electronic device 101. For example, a change in the network environment may include a change in signal quality of a first network (e.g., an NR network), a second network (e.g., an LTE network) and/or a third network (e.g., a wireless LAN network). According to an embodiment, the server 580 may provide the electronic device 101 with an IMS service (e.g., the transmission and reception of data based on a packet). For example, the server 580 may be denoted as an IMS server.

According to various embodiments, the electronic device 101 may obtain, from the ePDG 565, information related to a call function of a first network using first wireless communication based on a communication connection with the ePDG 565. According to an embodiment, the AMF 568 may deliver, to the ePDG 565, information related to a call function of a first network identified through a procedure of identifying a voice capability with the gNB 551. Upon communication connection with the electronic device 101, the ePDG 565 may transmit, to the electronic device 101, information related to a call function of a first network. For example, the information related to the call function of the first network may be obtained from the ePDG in a security association initialization or internet key exchange (IKE) negotiation process for a communication connection between the ePDG 565 and the electronic device 101. For example, the information related to call function of the first network may include information related to whether the first network supports a call function (e.g., VoNR) and information related to whether the first network supports the handover of a PDU session to the first network.

Figure 6:
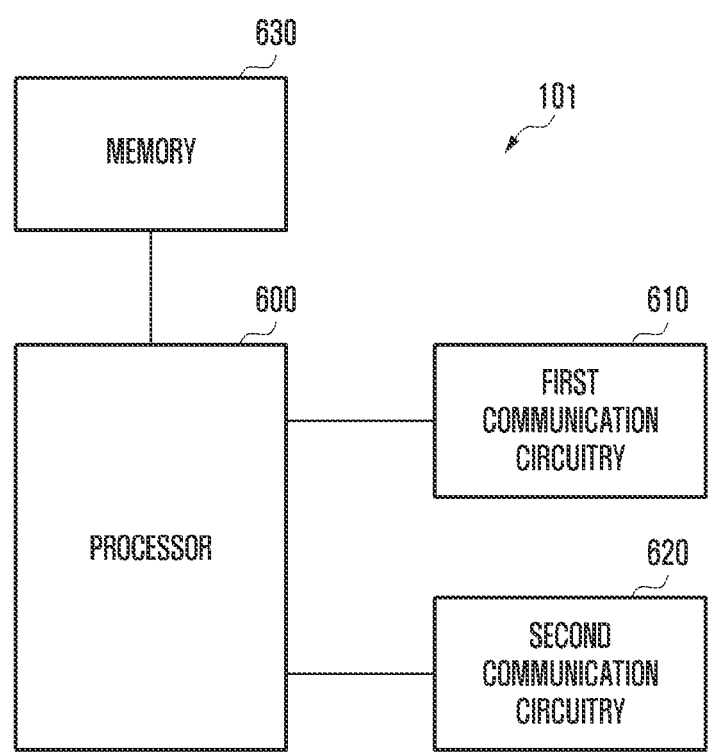
FIG. 6 is a block diagram of an electronic device for providing a call function according to an embodiment of the disclosure.

FIG. 6 is a block diagram of an electronic device for providing a call function according to an embodiment of the disclosure.

Referring to FIG. 6, an electronic device 101 may include a processor 600, first communication circuitry 610, second communication circuitry 620 and/or a memory 630. According to an embodiment, the processor 600 may be substantially identical with the processor 120 in FIG. 1 or may be included in the processor 120. The first communication circuitry 610 and/or the second communication circuitry 620 may be substantially identical with the wireless communication module 192 in FIG. 1 or may be included in the wireless communication module 192. The memory 630 may be substantially identical with the memory 130 in FIG. 1 or may be included in the memory 130. According to an embodiment, the processor 600, the first communication circuitry 610 and/or the second communication circuitry 620 may be implemented within a single chip or a single package. According to an embodiment, the processor 600, the first communication circuitry 610 and/or the second communication circuitry 620 may be implemented as different chips.

According to various embodiments, the processor 600 may be operatively connected to the first communication circuitry 610 and/or the second communication circuitry 620. According to an embodiment, the processor 600 may interact with the first communication circuitry 610 through an application processor to communication processor (AP2CP) interface. For example, the AP2CP interface may include at least one of a shared memory method or peripheral component interconnect-express (PCIe).

According to various embodiments, the first communication circuitry 610 may transmit and/or receive control messages and/or data to and/or from a first node (e.g., the NR base station 450 in FIG. 4B) and/or a second node (e.g., the LTE base station 440) through cellular communication. According to an embodiment, the first communication circuitry 610 may include a first processing part and a second processing part. For example, the first processing part may transmit and/or receive control messages and data to and/or from a first node (e.g., the NR base station 450 in FIG. 4B) through first wireless communication. For example, the first wireless communication may include a 5G communication method (e.g., new radio (NR)). For example, the second processing part may transmit and/or receive control messages and data to and/or from a second node (e.g., the LTE base station 440 in FIG. 4B) through second wireless communication. For example, the second wireless communication is a 4G communication method, and may include at least one of long-term evolution (LTE), LTE-advanced (LTE-A) or LTE advanced pro (LTE-A pro). For example, the second network using the second wireless communication may support a call function (e.g., VoLTE). For example, the first processing part and the second processing part may be composed of software which processes signals and protocols having different frequency bands. For example, the first processing part and the second processing part may be logically (e.g., software) divided from each other. For example, the first processing part and the second processing part may be composed of different circuits or different types of hardware.

According to an embodiment, the first communication circuitry 610 may include a communication processor (e.g., the second communication processor 214 in FIG. 2), an RFIC (e.g., the third RFIC 226 in FIG. 2) and/or an RFFE (e.g., the third RFFE 236 in FIG. 2) related to first wireless communication and a communication processor (e.g., the first communication processor 212 in FIG. 2), an RFIC (e.g., the first RFIC 222 in FIG. 2) and/or an RFFE (e.g., the first RFFE 232 in FIG. 2) related to second wireless communication.

According to various embodiments, the second communication circuitry 620 may transmit and/or receive control messages and data to and/or from a third node (e.g., an access point (AP)) through third wireless communication. For example, the third wireless communication may include a wireless LAN communication method (e.g., Wi-Fi) as a communication method using an unlicensed frequency band (unlicensed spectrum).

According to various embodiments, the processor 600 may control the first communication circuitry 610 and/or the second communication circuitry 620 to connect (or set up) a protocol data unit (PDU) session for a call connection with an external electronic device. According to an embodiment, the processor 600 may control the first communication circuitry 610 and/or the second communication circuitry 620 to connect a PDU session for the reception of a call originated from an external electronic device and/or the transmission of a call originated by the electronic device 101. For example, the PDU session may include an Internet protocol multimedia subsystem (IMS) PDU session.

According to an embodiment, if a call connection mode of the electronic device 101 has been configured as a first call connection mode (e.g., a cellular-preferred mode), the processor 600 may check signal quality of a cellular network (e.g., a first network using first wireless communication or a second network using second wireless communication). When the signal quality of the first network satisfies designated first quality, the processor 600 may control the first communication circuitry 610 to register the electronic device 101 with the first network using the first wireless communication. For example, the state in which the designated first quality has been satisfied may include a state in which signal quality of the first network using the first wireless communication is equal to or greater than first reference intensity (e.g., about −110 dBm). For example, signal quality of a network may include at least one of reference signal received power (RSRP), reference signal received quality (RSRQ), a received strength indicator (RSSI), a signal to interference plus noise ratio (SINR), a transmission and reception error ratio, packet transmission and reception delay or quality of service (QoS). For example, the call connection mode may be configured based on a call policy of the electronic device 101 and/or a user's input.

According to an embodiment, the processor 600 may control the first communication circuitry 610 to register the electronic device 101 with an IMS server (e.g., the server 580 in FIG. 5) over a first network using first wireless communication with which the electronic device 101 has registered. When the electronic device 101 registers with the IMS server over the first network, the processor 600 may identify that a PDU session has been connected over the first network.

According to an embodiment, when signal quality of a first network does not satisfy designated first quality and signal quality of a third network using third wireless communication satisfies designated second quality in the state in which a PDU session has been connected over the first network, the processor 600 may control the first communication circuitry 610 and the second communication circuitry 620 to perform handover of the PDU session. For example, the processor 600 may connect communication with an ePDG (e.g., the ePDG 565 in FIG. 5) (e.g., configure an ePDG tunnel) over the third network using the third wireless communication. The processor 600 may control the second communication circuitry 620 to register the electronic device 101 with an IMS server through the ePDG. When the electronic device 101 registers with the IMS server through the ePDG, the processor 600 may release the connection of a PDU session (e.g., an IMS PDU session) using the first network. For example, the state in which the designated first quality is not satisfied may include a state in which signal quality of the first network using the first wireless communication is less than first reference intensity (e.g., about −110 dBm). For example, the state in which the designated second quality is satisfied may include a state in which signal quality of the third network using the third wireless communication is equal to or greater than second reference intensity (e.g., about −70 dBm). For example, the handover may include a series of operations of releasing the connection with the first network and performing the connection with the third network. For example, in the case of a first handover method, after the connection with the first network is released, the connection with the third network may be performed. For example, in the case of a second handover method, after the connection with the third network is performed, the connection with the first network may be released.

According to an embodiment, if a call connection mode of the electronic device 101 has been configured as a second call connection mode (e.g., a wireless LAN-preferred mode), the processor 600 may check signal quality of a third network using third wireless communication. When the signal quality of the third network satisfies designated second quality, the processor 600 may connect communication with an ePDG (e.g., configure an ePDG tunnel) over the third network using the third wireless communication. The processor 600 may control the second communication circuitry 620 to register the electronic device 101 with an IMS server through the ePDG. When the electronic device 101 registers with the IMS server through the ePDG, the processor 600 may identify that a PDU session (e.g., an IMS PDU session) has been connected over the third network. For example, the ePDG may include a network element which provides a security function (e.g., authentication and/or encryption) for accessing a cellular network through a communication method (e.g., a wireless LAN communication method) using an unlicensed band.

According to an embodiment, when a PDU session is connected through the second communication circuitry 620, the electronic device 101 may maintain a registration (e.g., a physical connection) state with a cellular network (e.g., a first network using first wireless communication or a second network using second wireless communication) through the first communication circuitry 610. For example, if the handover of a PDU session from a first network to a third network has been performed, the first communication circuitry 610 may maintain a registration state (e.g., an RRC connected state) with the first network.

According to various embodiments, when a PDU session is connected over a third network using third wireless communication, the processor 600 may identify whether to use first wireless communication. According to an embodiment, the processor 600 may identify whether to use first wireless communication based on information related to a call function of a first network using the first wireless communication. For example, the information related to the call function of the first network may be obtained from an ePDG based on a communication connection with the ePDG. For example, the information related to the call function of the first network may be obtained from an ePDG in a security association initialization or Internet key exchange (IKE) negotiation process for a communication connection with the ePDG. For example, the information related to the call function of the first network may include information related to whether the first network supports a call function (e.g., VoNR) and information related to whether the first network supports the handover of a PDU session to the first network.

According to an embodiment, if a first network using first wireless communication does not support the handover of a PDU session to the first network, the processor 600 may restrict the use of the first wireless communication. For example, the use restriction on the first wireless communication may include a series of operations of configuring that the electronic device 101 does not support the first wireless communication through a non-access stratum (NAS) protocol of the first communication circuitry 610. For example, the NAS protocol may restrict search related to the first wireless communication, based on the use restriction on the first wireless communication. For example, the NAS protocol may transmit, as an access stratum (AS) protocol, information related to search for a network using second wireless communication based on the use restriction on the first wireless communication. The AS protocol may perform search for a network using the second wireless communication based on the information related to the search for a network using the second wireless communication received from the NAS protocol. For example, the first communication circuitry 610 (e.g., the second processing part) may perform search related to the second wireless communication by receiving at least one of a primary synchronization signal (PSS), a secondary synchronization signal (SSS), a master information block (MIB), or a system information block (SIB) based on the information related to the search for a network using the second wireless communication received from the NAS protocol.

According to an embodiment, if a first network using first wireless communication supports the handover of a PDU session to the first network and supports a call function (e.g., VoNR), the processor 600 may maintain the use of the first wireless communication.

According to an embodiment, if a first network using first wireless communication supports the handover of a PDU session to the first network and does not support a call function (e.g., VoNR), the processor 600 may identify whether to use the first wireless communication based on an operating state and/or network condition of the electronic device 101. For example, when the electronic device 101 operates in an idle mode, the processor 600 may maintain the use of the first wireless communication. For example, when an operating state of the electronic device 101 transitions from the idle mode to a call mode, the processor 600 may restrict the use of the first wireless communication. For example, when the electronic device 101 operates in the call mode, the processor 600 may restrict the use of the first wireless communication.

According to various embodiments, if the use of the first wireless communication is restricted, the processor 600 may control the first communication circuitry 610 to register the electronic device 101 with a second network using second wireless communication. According to an embodiment, if the use of the first wireless communication is restricted in the state in which the electronic device 101 has registered with the first network using the first wireless communication, the processor 600 may control the first communication circuitry 610 (e.g., the first processing part) to transmit a deregistration request message to the first network. When receiving a deregistration accept message from the first network through the first communication circuitry 610 (e.g., the first processing part), the processor 600 may release the registration with the first network. According to an embodiment, the processor 600 may control the first communication circuitry 610 (e.g., the second processing part) to transmit, to the second network using the second wireless communication, an attach request message including information indicating that the electronic device 101 does not support the first wireless communication, based on the deregistration with the first network using the first wireless communication. When receiving an attach accept message from the second network through the first communication circuitry 610 (e.g., the second processing part), the processor 600 may identify that the electronic device 101 has registered with the second network using the second wireless communication. For example, the second network using the second wireless communication may be identified through search for a network using the second wireless communication based on information related to search for a network using the second wireless communication, which is received from an NAS protocol.

According to various embodiments, when the electronic device 101 registers with the second network using the second wireless communication, the processor 600 may control the first communication circuitry 610 and the second communication circuitry 620 to perform the handover of a PDU session to the second network. According to an embodiment, if a call connection mode of the electronic device 101 has been configured as a first communication connection mode (e.g., a cellular-preferred mode), the processor 600 may periodically check signal quality of a cellular network (e.g., a second network using second wireless communication) in the state in which a PDU session has been connected over a third network. When the signal quality of the second network satisfies designated third quality, the processor 600 may control the first communication circuitry 610 and the second communication circuitry 620 to perform the handover of the PDU session. For example, the processor 600 may control the first communication circuitry 610 to register the electronic device 101 with an IMS server over the second network using the second wireless communication. When the electronic device 101 registers with the IMS server over the second network, the processor 600 may release the connection of a PDU session (e.g., an IMS PDU session) using the third network. For example, the state in which the designated third quality is satisfied may include a state in which signal quality of the second network using the second wireless communication is equal to or greater than third reference intensity (e.g., about −110 dBm).

According to an embodiment, if a call connection mode of the electronic device 101 has been configured as a second communication connection mode (e.g., a wireless LAN-preferred mode), the processor 600 may periodically check signal quality of a cellular network (e.g., a second network using second wireless communication) and a third network in the state in which a PDU session has been connected over the third network. When the signal quality of the third network does not satisfy designated second quality and the signal quality of the second network satisfies designated third quality, the processor 600 may control the first communication circuitry 610 and the second communication circuitry 620 to perform the handover of the PDU session. For example, the state in which the designated second quality is not satisfied may include a state in which signal quality of the third network using the third wireless communication is less than second reference intensity (e.g., about −70 dBm).

According to various embodiments, if the use of first wireless communication is maintained, the processor 600 may control the first communication circuitry 610 and the second communication circuitry 620 to perform the handover of a PDU session to a first network. According to an embodiment, if a call connection mode of the electronic device 101 has been configured as a first communication connection mode (e.g., a cellular-preferred mode), the processor 600 may periodically check signal quality of a cellular network (e.g., a first network using first wireless communication) in the state in which a PDU session has been connected over a third network. When the signal quality of the first network satisfies designated first quality, the processor 600 may control the first communication circuitry 610 and the second communication circuitry 620 to perform the handover of the PDU session. For example, the processor 600 may control the first communication circuitry 610 to register the electronic device 101 with an IMS server over the first network using the first wireless communication. When the electronic device 101 registers with the IMS server over the first network, the processor 600 may release the connection of a PDU session (e.g., an IMS PDU session) using the third network.

According to an embodiment, if a call connection mode of the electronic device 101 has been configured as a second communication connection mode (e.g., a wireless LAN-preferred mode), the processor 600 may periodically check signal quality of a cellular network (e.g., a first network using first wireless communication) and a third network in the state in which a PDU session has been connected over the third network. When the signal quality of the third network does not satisfy designated second quality and the signal quality of the first network satisfies designated first quality, the processor 600 may control the first communication circuitry 610 and the second communication circuitry 620 to perform the handover of a PDU session.

According to various embodiments, the memory 630 may store various data used by at least one element (e.g., the processor 600, the first communication circuitry 610 and/or the second communication circuitry 620) of the electronic device 101. According to an embodiment, the data may include information related to designated first quality, designated second quality and/or designated third quality for identifying whether to perform the handover of a PDU session. According to an embodiment, the data may include information related to a call function of a first network. According to an embodiment, the memory 630 may store various instructions which may be executed through the processor 600.

According to various embodiments, an electronic device (e.g., the electronic device 101 in FIG. 1, 2, 3, 4A, 4B, 5 or 6) may include first communication circuitry (e.g., the wireless communication module 192 in FIG. 1 or the first communication circuitry 610 in FIG. 6) supporting new radio (NR) communication and/or long term evolution (LTE) communication, second communication circuitry (e.g., the wireless communication module 192 in FIG. 1 or the second communication circuitry 620 in FIG. 6) supporting wireless LAN communication, and at least one processor (e.g., the processor 120 in FIG. 1 or the processor 600 in FIG. 6) operatively connected to the first communication circuitry and the second communication circuitry. The processor may resister the electronic device with a network using the NR communication through the first communication circuitry, may connect communication with an evolved packet data gateway (ePDG) based on a protocol data unit (PDU) session being identified as being connected over a network using wireless LAN communication in the state in which the electronic device has registered with the network using the NR communication, may obtain information related to a call function of the network using the NR communication based on the communication connection with the ePDG, may connect the PDU session over the network using the wireless LAN communication, and may control the connection with the network using the NR communication based on the information related to the call function of the network using the NR communication.

According to various embodiments, the processor may obtain the information related to the call function of the network using the NR communication through an Internet key exchange (IKE) negotiation operation or security association initialization operation for the communication connection with the ePDG.

According to various embodiments, the information related to the call function of the network using the NR communication may include information related to whether the network using the NR communication supports the call function and/or information related to whether the network using the NR communication supports the handover of the PDU session to the network using the NR communication.

According to various embodiments, based on the handover of the PDU session to the network using the NR communication being not supported by the network using the NR communication, the processor may restrict the use of the network using the NR communication based on the PDU session connection through the network using wireless LAN communication.

According to various embodiments, based on the use of the network using the NR communication being restricted, the processor may release the registration with the network using the NR communication and register the electronic device with a network using the LTE communication.

According to various embodiments, based on the handover of the PDU session to the network using the NR communication being supported and the call function being supported by the network using the NR communication, the processor may maintain the use of the NR communication.

According to various embodiments, based on the use of the network using the NR communication being maintained, the processor may maintain the registration with the network using the NR communication in the state in which the PDU session has been connected over the network using the wireless LAN communication.

According to various embodiments, based on the handover of the PDU session to the network using the NR communication being supported and the call function being not supported by the network using the NR communication, the processor may control the connection with the network using the NR communication based on an operation mode and/or network policy of the electronic device.

According to various embodiments, the processor may maintain the use of the NR communication based on the electronic device being in an idle mode, and may restrict the use of the NR communication based on the electronic device being in a call mode.

According to various embodiments, the PDU session may include an Internet protocol multimedia subsystem (IMS) PDU session.

Figure 7:
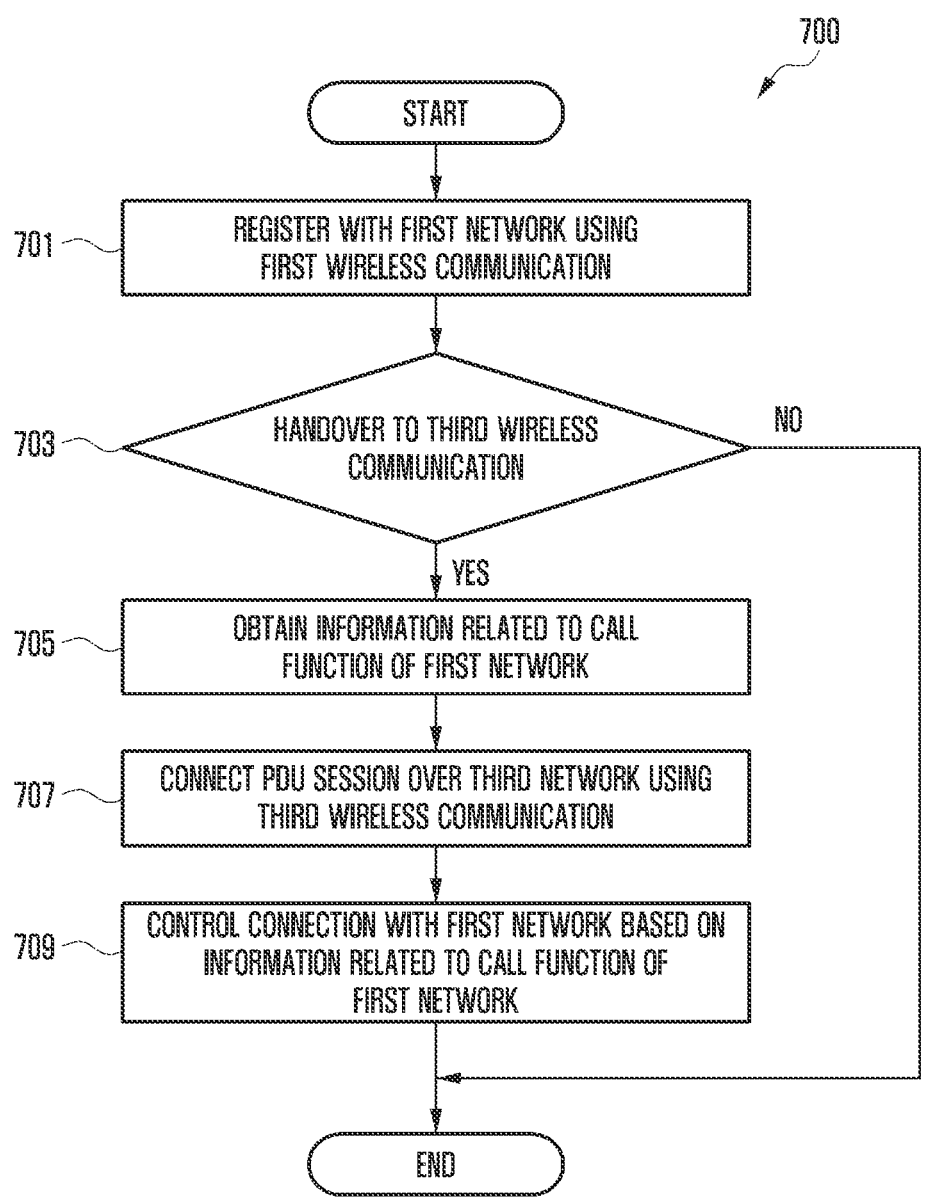
FIG. 7 is a flowchart for selectively restricting the use of first wireless communication in an electronic device according to an embodiment of the disclosure.

FIG. 7 is a flowchart 700 for selectively restricting the use of first wireless communication in an electronic device according to an embodiment of the disclosure. In the following embodiments, operations may be sequentially performed, but are not essentially sequentially performed. For example, the order of the operations may be changed, and at least two operations thereof may be performed in parallel. For example, the electronic device may be the electronic device 101 in FIG. 1, 2, 3, 4A, 4B, 5 or 6.

Referring to FIG. 7, according to various embodiments, in operation 701, an electronic device (e.g., the wireless communication module 192 in FIG. 1, the processor 120 in FIG. 1, the first communication circuitry 610 in FIG. 6 or the processor 600 in FIG. 6) may register with a first network using first wireless communication. According to an embodiment, the processor 600 may control the first communication circuitry 610 (e.g., a first processing part) to register the electronic device 101 with the first network using the first wireless communication (e.g., NR communication). For example, if the first network using the first wireless communication is operated independently of a second network using second wireless communication (e.g., standalone (SA)), the electronic device 101 may be preferentially registered with the first network using the first wireless communication. According to an embodiment, the processor 600 may control the first communication circuitry 610 (e.g., the first processing part) to connect a PDU session over the first network with which the electronic device 101 has registered. For example, the PDU session may include an Internet protocol multimedia subsystem (IMS) PDU session.

According to various embodiments, in operation 703, an electronic device (e.g., the processor 120 or 600) may identify whether to use third wireless communication for the connection of a PDU session. According to an embodiment, if a call connection mode of the electronic device 101 has been configured as a first communication connection mode (e.g., a cellular-preferred mode), the processor 600 may periodically check signal quality of the first network and a third network using the third wireless communication in the state in which a PDU session has been connected over the first network. When the signal quality of the first network does not satisfy designated first quality and the signal quality of the third network satisfies designated second quality, the processor 600 may identify that the handover of the PDU session to the third network is performed.

According to an embodiment, if a call connection mode of the electronic device 101 has been configured as a second call connection mode (e.g., a wireless LAN-preferred mode), the processor 600 may periodically check signal quality of a third network using third wireless communication in the state in which a PDU session has been connected over the first network. When the signal quality of the third network satisfies designated second quality, the processor 600 may identify that the handover of the PDU session to the third network is performed.

According to various embodiments, when identifying that the third wireless communication is not used for the connection of the PDU session (e.g., "No" in operation 703), an electronic device (e.g., the processor 120 or 600) may terminate an embodiment for selectively restricting the use of the first wireless communication. According to an embodiment, when identifying that the third wireless communication is not used for the connection of the PDU session, the processor 600 may control the first communication circuitry 610 to maintain the connection of the PDU session over the first network. Accordingly, the processor 600 may identify as continuously using the first wireless communication.

According to various embodiments, when identifying that the third wireless communication is used for the connection of the PDU session (e.g., "Yes" in operation 703), in operation 705, an electronic device (e.g., the processor 120 or 600) may identify information related to a call function of the first network based on a communication connection with an ePDG (e.g., the ePDG 565 in FIG. 5).

According to an embodiment, when identifying that the third wireless communication is used for the connection of the PDU session, the processor 600 may connect communication with an ePDG (e.g., configure an ePDG tunnel) over the third network using the third wireless communication. According to an embodiment, the processor 600 may obtain, from the ePDG, information related to a call function of the first network through a security association initialization or Internet key exchange (IKE) negotiation process for the communication connection with the ePDG.

For example, the processor 600 may transmit, to the ePDG, a request signal configured as in Table 1 (e.g., RFC 7296) over the third network for an IKE negotiation.

TABLE 1

[N(INITIAL_CONTACT),]
[[N(HTTP_CERT_LOOKUP_SUPPORTED),] CERTREQ+,]
[IDr,]
[CP(CFG_REQUEST(VONR( ), HANDOVER( )),]
[N(IPCOMP_SUPPORTED)+,]
[N(USE_TRANSPORT_MODE),]
[N(ESP_TFC_PADDING_NOT_SUPPORTED),]
[N(NON_FIRST_FRAGMENTS_ALSO),]
SA, TSi, TSr,
[V+][N+]

For example, the request signal related to the IKE negotiation may include request information (e.g., [CP(CFG_REQUEST(VONR( ), HANDOVER( )),]) of the information related to the call function of the first network.

For example, the processor 600 may identify information (e.g., [CP(CFG_REPLY(VONR(1), HANDOVER(1)),]) related to the call function of the first network in a response signal configured as in Table 2 (e.g., RFC 7296), as a response to the request signal related to the IKE negotiation.

TABLE 2

[CP(CFG_REPLY(VONR(1), HANDOVER(1)),]
[N(IPCOMP_SUPPORTED),]
[N(USE_TRANSPORT_MODE),]
[N(ESP_TFC_PADDING_NOT_SUPPORTED),]
[N(NON_FIRST_FRAGMENTS_ALSO),]
SA, TSi, TSr,
[N(ADDITIONAL_TS_POSSIBLE),]
[V+][N+]

For example, the information related to the call function of the first network may include information related to whether the first network supports a call function (e.g., VoNR) and information related to whether the first network supports the handover of a PDU session to the first network.

Figure 10:
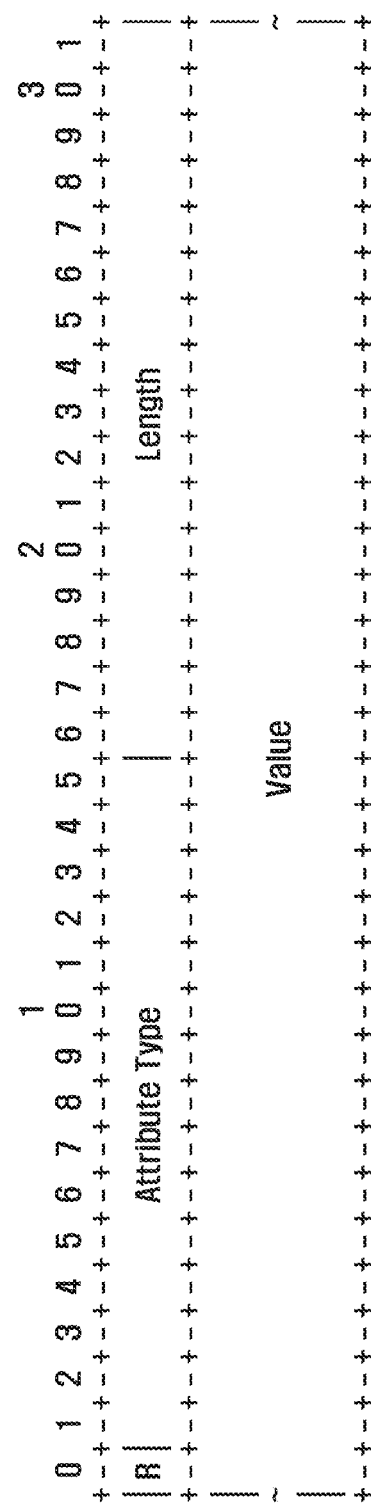
FIG. 10 is a diagram depicting configured information related to whether a first network supports a call function and/or information related to whether a first network supports handover of a PDU session according to an embodiment of the disclosure.

FIG. 10 is a diagram depicting configured information related to whether a first network supports a call function and/or information related to whether a first network supports handover of a PDU session according to an embodiment of the disclosure.

Referring to FIG. 10, as an example, the information related to whether the first network supports a call function (e.g., VoNR) and/or the information related to whether the first network supports the handover of a PDU session to the first network may be configured as in FIG. 10.

For example, Attribute Type may indicate information (e.g., Integer (16391)) related to whether the call function is supported or information (e.g., Integer (16392)) related to whether the handover is supported. For example, Value may include a value corresponding to whether the call function is supported or whether the handover is supported. For example, Length may include information related to a total length of the configuration in FIG. 10.

Referring to FIG. 7, according to various embodiments, in operation 707, an electronic device (e.g., the processor 120 or 600) may connect a PDU session for the call function with an external electronic device over the third network using the third wireless communication. According to an embodiment, when connecting communication with an ePDG, the processor 600 may control the second communication circuitry 520 to register the electronic device with an IMS server through the ePDG. When the electronic device registers with the IMS server through the ePDG, the processor 600 may identify that a PDU session (e.g., an IMS PDU session) has been connected over the third network. For example, a PDU session (e.g., an IMS PDU session) using the first network may be released based on the PDU session connection through the third network. For example, the processor 600 may control the first communication circuitry 510 and the second communication circuitry 520 to connect the PDU session over the third network and perform handover related to a PDU session, which releases the connection of the PDU session using the first network. For example, when the connection of the PDU session using the first network is released, the electronic device 101 may maintain a registration (e.g., physical connection) state with the first network using the first wireless communication through the first communication circuitry 510.

According to various embodiments, in operation 709, an electronic device (e.g., the processor 120 or 600) may control a connection (e.g., a physical connection) with the first network using the first wireless communication based on the information related to the call function of the first network. According to an embodiment, if the first network using the first wireless communication does not support the handover of a PDU session to the first network in the state in which a PDU session has been connected over a third network, the processor 600 may restrict the use of the first wireless communication. According to an embodiment, if the first network using the first wireless communication supports the handover of the PDU session to the first network and supports a call function (e.g., VoNR) in the state in which the PDU session has been connected over the third network, the processor 600 may maintain the use of the first wireless communication. According to an embodiment, if the first network using the first wireless communication supports the handover of the PDU session to the first network and does not support a call function (e.g., VoNR) in the state in which the PDU session has been connected over the third network, the processor 600 may identify whether to use the first wireless communication based on an operating state and/or network condition of the electronic device 101.

According to various embodiments, if the use of the first wireless communication is restricted, an electronic device (e.g., the processor 120 or 600) may register with a second network using second wireless communication. According to an embodiment, if the use of the first wireless communication is restricted in the state in which the electronic device 101 has registered with the first network using the first wireless communication, the processor 600 may control the first communication circuitry 610 (e.g., the first processing part) to release the registration with the first network. When the registration with the first network is released, the processor 600 may control the first communication circuitry 610 (e.g., the second processing part) to perform the registration with the second network using the second wireless communication. For example, the registration with the second network may include a series of operations of performing the registration with the second network identified through search for a network using the second wireless communication.

According to various embodiments, an electronic device (e.g., the processor 120 or 600) may perform handover to a PDU session over a cellular network (e.g., a first network or a second network) with which the electronic device 101 has registered. According to an embodiment, if a call connection mode of the electronic device 101 has been configured as a first communication connection mode (e.g., a cellular-preferred mode), the processor 600 may periodically check signal quality of a cellular network (e.g., a first network or a second network) with which the electronic device 101 has registered in the state in which a PDU session has been connected over a third network. When the signal quality of the cellular network satisfies designated quality, the processor 600 may control the first communication circuitry 610 and the second communication circuitry 620 to perform the handover of the PDU session to the cellular network.

According to an embodiment, if a call connection mode of the electronic device 101 has been configured as a second communication connection mode (e.g., a wireless LAN-preferred mode), the processor 600 may periodically check signal quality of a cellular network (e.g., a first network or a second network) with which the electronic device 101 has registered and a third network in the state in which a PDU session has been connected over the third network. When the signal quality of the third network does not satisfy designated second quality and the signal quality of the cellular network satisfies designated quality, the processor 600 may control the first communication circuitry 610 and the second communication circuitry 620 to perform the handover of the PDU session to the cellular network.

Figure 8:
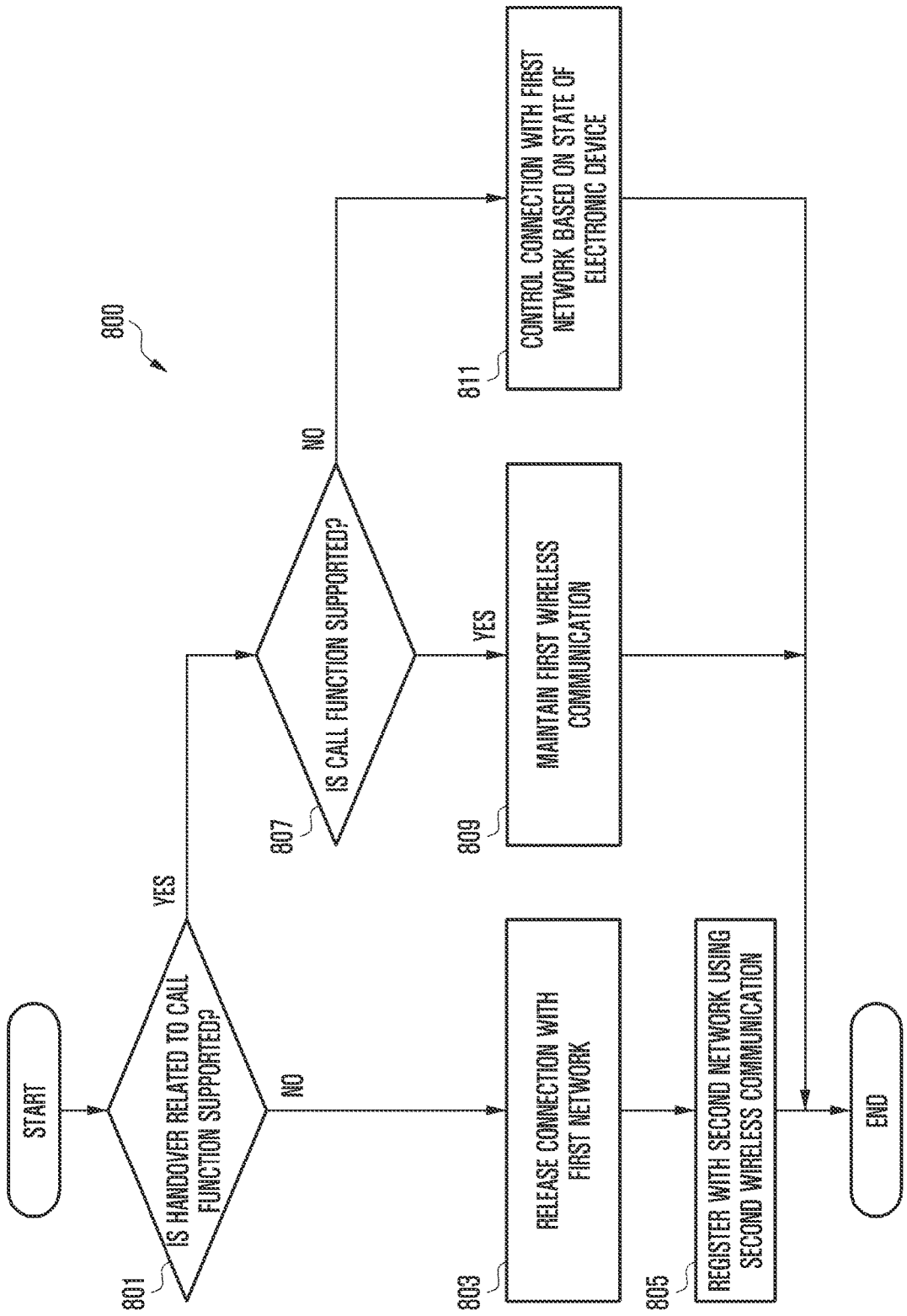
FIG. 8 is a flowchart for selectively controlling a connection with a network using first wireless communication in an electronic device according to an embodiment of the disclosure.

FIG. 8 is a flowchart 800 for selectively controlling a connection with a network using first wireless communication in an electronic device according to an embodiment of the disclosure. According to an embodiment, at least some of FIG. 8 may include detailed operations of operation 709 in FIG. 7. In the following embodiments, the operations may be sequentially performed, but are not essentially sequentially performed. For example, the order of the operations may be changed, and at least two operations thereof may be performed in parallel. For example, the electronic device may be the electronic device 101 in FIG. 1, 2, 3, 4A, 4B, 5 or 6.

Referring to FIG. 8, when connecting a PDU session for a call function with an external electronic device over a third network using third wireless communication (e.g., in operation 707 in FIG. 7), in operation 801, an electronic device (e.g., the processor 120 in FIG. 1 or the processor 600 in FIG. 6) may identify whether a first network with which the electronic device 101 has registered supports handover related to the call function. For example, the handover related to the call function, which is supported by the first network, may include the handover of the PDU session from the third network, which is supported by the first network with which the electronic device 101 has registered.

According to various embodiments, if the first network with which the electronic device 101 has registered does not support the handover related to the call function (e.g., "No" in operation 801), in operation 803, an electronic device (e.g., the processor 120 or 600) may release a connection with the first network with which the electronic device 101 has registered. According to an embodiment, if the first network using the first wireless communication does not support the handover of the PDU session to the first network, the processor 600 may restrict the use of the first wireless communication. According to an embodiment, if the first network using the first wireless communication does not support the handover of the PDU session to the first network, the processor 600 may restrict the use of the first wireless communication. The processor 600 may control the first communication circuitry 610 (e.g., a first processing part) to transmit a deregistration request message to the first network based on a use restriction on the first wireless communication. When receiving a deregistration accept message from the first network through the first communication circuitry 610 (e.g., the first processing part), the processor 600 may release the registration with the first network.

According to various embodiments, in operation 805, an electronic device (e.g., the processor 120 or 600) may register with a second network using second wireless communication based on the release of the connection with the first network. According to an embodiment, the processor 600 may control the first communication circuitry 610 (e.g., a second processing part) to perform search for a network using the second wireless communication based on the deregistration with the first network using the first wireless communication. The processor 600 may control the first communication circuitry 610 (e.g., the second processing part) to transmit an attach request message to the second network using the second wireless communication, which has been retrieved through the network search. When receiving an attach accept message from the second network through the first communication circuitry 610 (e.g., the second processing part), the processor 600 may identify that the electronic device 101 has registered with the second network using the second wireless communication. According to an embodiment, the electronic device 101 may maintain a physical connection state with the second network in the state in which the PDU session has been connected over a third network using third wireless communication.

According to various embodiments, if the first network with which the electronic device 101 has registered supports the handover related to the call function (e.g., "Yes" in operation 801), in operation 807, an electronic device (e.g., the processor 120 or 600) may identify whether the first network supports the call function. For example, the call function of the first network may include a function (e.g., VoNR) for connecting a call with an external electronic device through the PDU session to which the electronic device 101 has been connected over the first network.

According to various embodiments, if the first network with which the electronic device 101 has registered supports the call function (e.g., "Yes" in operation 807), in operation 809, an electronic device (e.g., the processor 120 or 600) may identify as maintaining the use of the first wireless communication. According to an embodiment, if the first network using the first wireless communication supports the handover of the PDU session to the first network and supports a call function (e.g., VoNR), the processor 600 may maintain the use of the first wireless communication. According to an embodiment, the electronic device 101 may maintain a physical connection state with the first network in the state in which the PDU session has been connected over a third network using third wireless communication.

According to various embodiments, if the first network with which the electronic device 101 has registered does not support the call function (e.g., "No" in operation 807), in operation 811, an electronic device (e.g., the processor 120 or 600) may control a connection (e.g., a physical connection) with the first network using the first wireless communication based on an operating state and/or network condition of the electronic device 101. For example, the operating state of the electronic device 101 may include an idle mode and/or a call mode. For example, the idle mode may include a state in which a call of the electronic device 101 with an external electronic device has not been connected. For example, the call mode may include a state in which a call of the electronic device 101 with an external electronic device has been connected.

Figure 9:
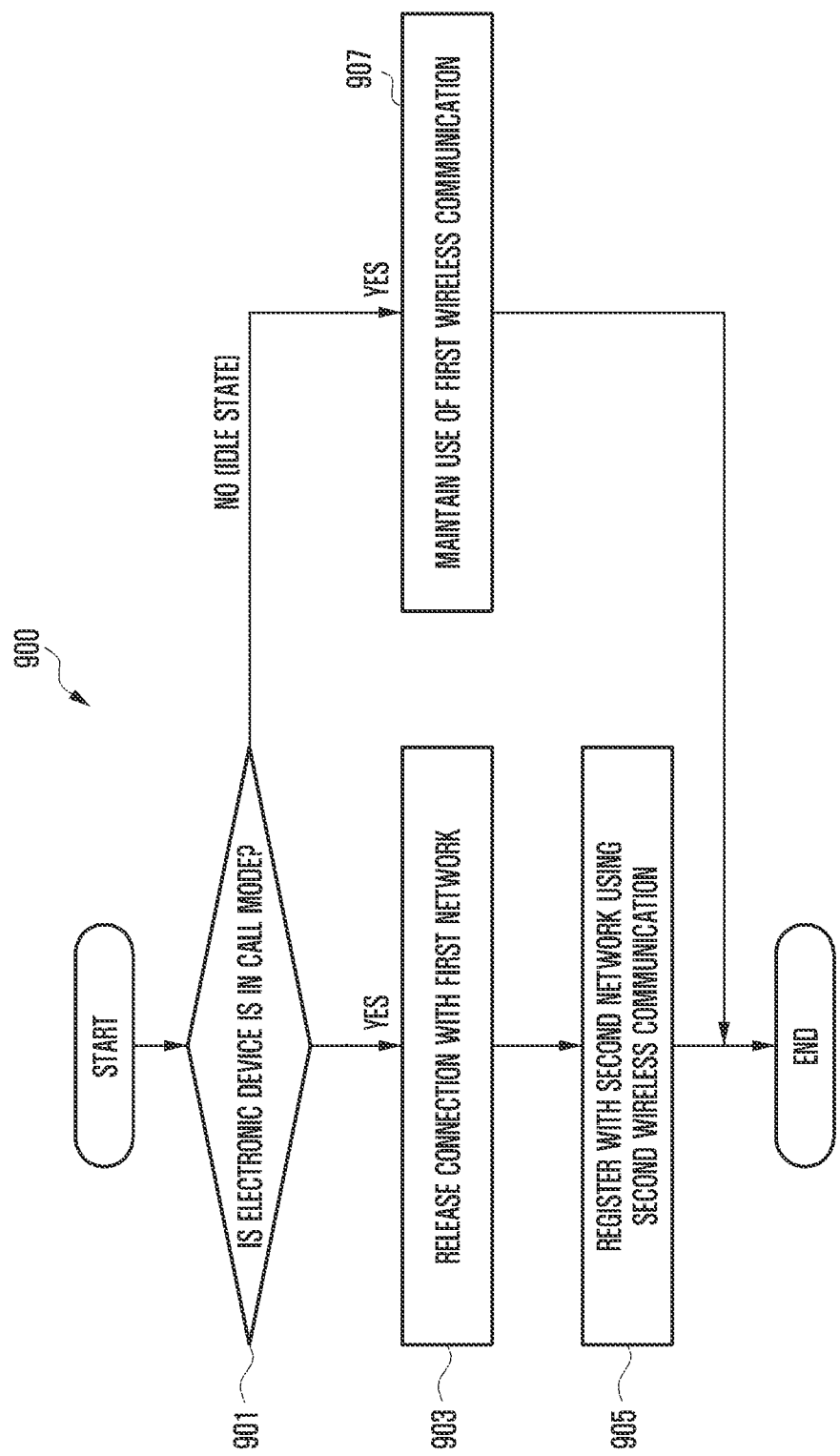
FIG. 9 is a flowchart for selectively controlling a connection with a network using first wireless communication based on an operating state of an electronic device in the electronic device according to an embodiment of the disclosure.

FIG. 9 is a flowchart 900 for selectively controlling a connection with a network using first wireless communication based on an operating state of an electronic device in the electronic device according to an embodiment of the disclosure. According to an embodiment, at least some of FIG. 9 may include detailed operations of operation 811 in FIG. 8. In the following embodiments, operations may be sequentially performed, but are not essentially sequentially performed. For example, the order of the operations may be changed, and at least two of the operations may be performed in parallel. For example, the electronic device may be the electronic device 101 in FIG. 1, 2, 3, 4A, 4B, 5 or 6.

Referring to FIG. 9, if a first network with which the electronic device 101 has registered supports a call function (e.g., "Yes" in operation 807 in FIG. 8), in operation 901, an electronic device (e.g., the processor 120 in FIG. 1 or the processor 600 in FIG. 6) may identify whether an operation mode of the electronic device 101 is a call mode. According to an embodiment, if the first network using first wireless communication supports the handover of a PDU session to the first network and does not support a call function (e.g., VoNR), the processor 600 may identify whether an operation mode of the electronic device 101 is the call mode.

According to various embodiments, when an operation mode of the electronic device 101 is the call mode (e.g., "Yes" in operation 901), in operation 903, an electronic device (e.g., the processor 120 or 600) may release a connection with the first network with which the electronic device 101 has registered. According to an embodiment, when a call of the electronic device 101 with an external electronic device is connected (e.g., the call mode), the processor 600 may restrict the use of the first network. According to an embodiment, the processor 600 may control the first communication circuitry 610 (e.g., the first processing part) to release a physical connection with the first network based on a use restriction on the first wireless communication. For example, the electronic device 101 may release a physical connection with the first network in the state in which a PDU session has been connected over a third network.

According to various embodiments, in operation 905, an electronic device (e.g., the processor 120 or 600) may register with a second network using second wireless communication based on the release of the physical connection with the first network. According to an embodiment, when releasing the physical connection with the first network based on the use restriction on the first wireless communication, the processor 600 may control the first communication circuitry 610 (e.g., a second processing part) to perform a physical connection with the second network using the second wireless communication. For example, the second network may be searched for through search for a network using the second wireless communication. For example, the electronic device 101 may maintain a physical connection with the second network in the state in which a PDU session has been connected over a third network.

According to various embodiments, when an operation mode of the electronic device 101 is not the call mode (e.g., "No" in operation 901), in operation 907, an electronic device (e.g., the processor 120 or 600) may identify as maintaining the use of the first wireless communication. According to an embodiment, when an operation mode of the electronic device 101 is the idle mode, the processor 600 may identify as maintaining the use of the first network. According to an embodiment, when identifying as maintaining the use of the first network, the electronic device 101 may maintain a physical connection state with the first network in the state in which a PDU session has been connected over a third network using third wireless communication.

According to various embodiments, the electronic device 101 may update (or obtain) information related to the call function of the first network in the state in which communication with an ePDG has been connected. According to an embodiment, the ePDG may transmit, to the electronic device 101, information (e.g., [CP(CFG_REQUEST(VONR (1), HANDOVER(1)),]) related to the call function of the first network using first wireless communication in the form of an information packet, such as Table 3, in the state in which communication with the electronic device 101 has been connected.

TABLE 4

[N+,]
[D+,]
[CP(CFG_REQUEST(VONR(1), HANDOVER(1)),]

According to an embodiment, when receiving information related to a call function of a first network from an ePDG, the electronic device 101 may update information related to the call function of the first network and stored in the electronic device 101, based on the information related to the call function of the first network obtained from the ePDG.

According to an embodiment, when receiving the information related to the call function of the first network from the ePDG, the electronic device 101 may transmit, to the ePDG, a response signal having a form such as Table 4.

TABLE 5

[N+,]
[D+,]
[CP(CFG_REPLY(VONR(1), HANDOVER(1)),]

According to various embodiments, an operating method of an electronic device (e.g., the electronic device 101 in FIG. 1, 2, 3, 4A, 4B, 5 or 6) may include an operation of registering with a network using new radio (NR) communication, an operation of connecting communication with an evolved packet data gateway (ePDG) based on a protocol data unit (PDU) session being connected over a network using wireless LAN communication in the state in which the electronic device has registered with the network using the NR communication, an operation of obtaining information related to a call function of the network using the NR communication based on the communication connection with the ePDG, an operation of connecting the PDU session over the network using the wireless LAN communication, and an operation of controlling the connection with the network using the NR communication based on the information related to the call function of the network using the NR communication.

According to various embodiments, the operation of obtaining information related to the call function of the network using the NR communication may include an operation of obtaining the information related to the call function of the network using the NR communication through an Internet key exchange (IKE) negotiation operation or security association initialization operation for the communication connection with the ePDG.

According to various embodiments, the information related to the call function of the network using the NR communication may include information related to whether the network using the NR communication supports the call function and/or information related to whether the network using the NR communication supports the handover of the PDU session to the network using the NR communication.

According to various embodiments, the operation of controlling the connection with the network using the NR communication may include an operation of restricting the use of the network using the NR communication based on the PDU session connection through the network using the wireless LAN communication based on the handover of the PDU session to the network using the NR communication being not supported.

According to various embodiments, the operation of restricting the use of the network using the NR communication may include an operation of releasing the registration with the network using the NR communication and an operation of registering with a network using LTE communication, based on the use of the network using the NR communication being limited.

According to various embodiments, the operation of controlling the connection with the network using the NR communication may include an operation of maintaining the use of the NR communication, based on the handover of the PDU session to the network using the NR communication being supported and the call function being supported by the network using the NR communication.

According to various embodiments, the operation of maintaining the use of the NR communication may include an operation of maintaining the registration with the network using the NR communication in the state in which the PDU session has been connected over the network using wireless LAN communication.

According to various embodiments, the operation of controlling the connection with the network using the NR communication may include an operation of controlling the connection with the network using the NR communication based on an operation mode and/or network policy of the electronic device, based on the handover of the PDU session to the network using the NR communication being supported and the call function being not supported by the network using the NR communication.

According to various embodiments, the operation of controlling the connection with the network using the NR communication may include an operation of maintaining the use of the NR communication based on the electronic device being in an idle mode and an operation of restricting the use of the NR communication based on the electronic device being in a call mode.

According to various embodiments, the PDU session may include an Internet protocol multimedia subsystem (IMS) PDU session.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   first communication circuitry supporting new radio (NR) communication and long term evolution (LTE) communication;
   second communication circuitry supporting wireless local area network (LAN) communication; and
   at least one processor operatively connected to the first communication circuitry and the second communication circuitry,
   wherein the at least one processor is configured to:
      register, via the first communication circuitry, the electronic device with an NR network for the NR communication,
      connect, via the second communication circuitry, communication with an evolved packet data gateway (ePDG) based on a protocol data unit (PDU) session being identified as being connected over a wireless LAN network for the wireless LAN communication in a state in which the electronic device has registered with the NR network,
      obtain, from the ePDG, information related to a call function of the NR network including at least one of information related to whether the NR network supports the call function or information related to whether the NR network supports handover of the PDU session to the NR network,
      connect the PDU session over the wireless LAN network,
      if the NR network does not support the handover of the PDU session to the NR network, release the registration with the NR network and register the electronic device with an LTE network for the LTE communication, in a state in which the connection of the PDU session over the wireless LAN network is maintained, and if the NR network supports the handover of the PDU session to the NR network and supports the call function, maintain the registration with the NR network, in a state in which the connection of the PDU session over the wireless LAN network is maintained.

2. The electronic device of claim 1, wherein the at least one processor is further configured to obtain the information related to the call function of the NR network through an Internet key exchange (IKE) negotiation operation or security association initialization operation for the communication connection with the ePDG.

3. The electronic device of claim 1, wherein the at least one processor is further configured to control the connection with the NR network based on at least one of an operation mode or network policy of the electronic device, based on the handover of the PDU session to the NR network being supported and the call function being not supported by the NR network.

4. The electronic device of claim 3, wherein the at least one processor is further configured to:
 maintain the use of the NR communication based on the electronic device being in an idle mode, and
 restrict the use of the NR communication based on the electronic device being in a call mode.

5. The electronic device of claim 1, wherein the PDU session comprises an Internet protocol multimedia subsystem (IMS) PDU session.

6. A method of operating an electronic device, the method comprising:
 registering with an new radio (NR) network for NR communication;
 connecting communication with an evolved packet data gateway (ePDG) based on a protocol data unit (PDU) session being identified as being connected over a wireless LAN network for wireless LAN communication in a state in which the electronic device has registered with the NR network;
 obtaining, from the ePDG, information related to a call function of the NR network including at least one of information related to whether the NR network supports the call function or information related to whether the NR network supports handover of the PDU session to the NR network;
 connecting the PDU session over the wireless LAN network; and
 if the NR network does not support the handover of the PDU session to the NR network, releasing the registration with the NR network and registering the electronic device with an long term evolution (LTE) network for LTE communication, in a state in which the connection of the PDU session over the wireless LAN network is maintained; and
 if the NR network supports the handover of the PDU session to the NR network and supports the call function, maintaining the registration with the NR network, in a state in which the connection of the PDU session over the wireless LAN network is maintained.

7. The method of claim 6, wherein the obtaining of the information related to the call function of the NR network comprises obtaining the information related to the call function of the NR network through an Internet key exchange (IKE) negotiation operation or security association initialization operation for the communication connection with the ePDG.

8. The method of claim 6,
 wherein the controlling of the connection with the NR network comprises controlling the connection with the NR network based on at least one of an operation mode or network policy of the electronic device, based on the handover of the PDU session to the NR network being supported and the call function being not supported by the NR network.

9. The method of claim 8, wherein the controlling of the connection with the network using the NR communication comprises:
 maintaining the use of the NR communication based on the electronic device being in an idle mode; and
 restricting the use of the NR communication based on the electronic device being in a call mode.

10. The method of claim 6, wherein the PDU session comprises an Internet protocol multimedia subsystem (IMS) PDU session.

* * * * *